United States Patent [19]

Hockersmith

[11] 4,413,468
[45] Nov. 8, 1983

[54] LAWN MOWER BLADE RETAINER

[75] Inventor: Harold M. Hockersmith, Richmond, Ind.

[73] Assignee: Hoffco, Inc., Richmond, Ind.

[21] Appl. No.: 364,992

[22] Filed: Apr. 2, 1982

[51] Int. Cl.$^3$ ............................................. A01D 55/18
[52] U.S. Cl. ..................................................... 56/295
[58] Field of Search ..................... 56/295, 17.4, 17.5, 56/255, 256, 11.3, 11.6

[56] References Cited

U.S. PATENT DOCUMENTS 3,044,241  7/1962  Snider ................................. 56/295
4,148,173  4/1979  Hoff .................................... 56/11.3

FOREIGN PATENT DOCUMENTS 1901723  8/1970  Fed. Rep. of Germany ........ 56/295

*Primary Examiner*—Jay N. Eskovitz
*Attorney, Agent, or Firm*—Barnes & Thornburg

[57] ABSTRACT

A rotary lawn mower blade mounted on a blade carrier by diametrically spaced bolts is further retained against release from the drive shaft by a retainer fixed on the drive shaft and having a cylindrical shank extending in bearing relation through a central opening in the blade having an enlarged head to obstruct separation of the blade from the retainer. The head includes at least one radial projection and the opening one radial extension, and the head and opening have one orientation in which the same are in registry to permit axial removal of the blade from the retainer. Preferably, the head is triangular with three truncated apexes, one of which is longer than the others and another of which may be wider than all others. The sides of the triangular blade opening lie tangent to the cylindrical retainer shank to hold the blade concentric with such shank.

10 Claims, 4 Drawing Figures

LAWN MOWER BLADE RETAINER

This invention relates to a safety mounting for the blade of a rotary lawn mower.

In a rotary lawn mower, the cutting is done with a heavy blade which is carried by the lower end of an engine shaft or other drive shaft and which rotates in a plane normal to the axis of such shaft and close to ground level. The heavy blade has a high polar moment of enertia, and in the recent past has been relied on to provide the primary flywheel effect for the engine. In the use of such a lawn mower, if the end of the rapidly rotating blade strikes a fixed object so that the end of the blade is stopped, the blade tends to continue rotation about the fixed object as a fulcrum and exerts heavy stress on the shaft and mounting.

The U.S. Consumer Product Safety Commission has recently promulgated a safety standard for walk-behind power lawn mowers which requires that all lawn mowers manufactured after June 31, 1982 must have a control (deadman control) and a blade-control system which will (1) prevent the blade from operating unless the operator actuates the control; (2) requires continuous contact with the control in order for the blade to continue to be driven; and (3) cause the blade to stop within three seconds after release of the control (Federal Register, Volume 44, No. 33, Feb. 13, 1979, pages 9990 et seq. 9993; and subsequent amendments thereof). To meet this safety standard, it is generally proposed to mount the blade on a shaft by means of a clutch-brake mechanism which declutches the blade from the shaft when the deadman control is released, and applies a brake to stop the blade. In such mechanism, the blade is carried by a blade carrier rotatable on the axis of the drive shaft, and the blade is commonly attached to such carrier by a pair of diametrically spaced eccentric bolts.

With the use of such a clutch-brake mechanism, the blade can no longer serve to provide flywheel effect for the engine, particularly when it is declutched therefrom, and in my U.S. Pat. No. 4,148,173 of Apr. 10, 1979, there is disclosed a clutch-brake mechanism which includes a heavy flywheel mounted on the hub of the clutch-brake mechanism, near the plane of the blade mounting.

When the blade is mounted by spaced eccentric bolts, and especially when the blade-mounting mechanism includes a flywheel, the stress on the blade-mounting mechanism when the blade strikes a fixed object is especially severe, and may indeed shear one or both of the blade-mounting bolts so as to permit the blade to come loose and be thrown outward forcibly. This can produce serious danger to the operator and to bystanders.

A co-pending application of Stephen J. Hoff, Ser. No. 364,422, filed Apr. 1, 1982, which is a continuation-in-part of application Ser. No. 158,700, filed June 12, 1980, discloses a blade retainer having a relatively small cylindrical shank extending through a relatively much larger circular blade opening and having a large head formed by two opposite projections. The relationship is such that the blade can be engaged with the retainer by a series of manipulations, including first tilting the blade and engaging its opening over one projection, then moving the tilted blade to a position in which it clears the other projections, and tilting the blade over such second projection. Disengagement requires a reverse series of manipulations, but these can occur in any relative orientation of the blade relative to the retainer, and engagement of the small shank of the retainer in the larger opening of the blade will not serve to hold the blade concentric with the shaft.

The present invention seeks to prevent the danger that the blade will become loose by providing a secondary barrier against release of the blade from its mounting and the shaft, and to do so by means which will hold a loose blade concentric with the shaft.

In accordance with the present invention, the lawn mower blade is mounted on the blade carrier by a pair of eccentric blade bolts which may be either in the form of cap screws which are inserted through holes in the blade and engaged in nuts fixed in the blade carrier, or may be studs fixed on the blade carrier which extend through the blade-mounting holes and receive nuts on their lower ends to secure the blade to the carrier. The blade has a central hole of unsymmetrical configuration, and the blade drive shaft carries at its lower end a retainer which includes a shank portion of cylindrical configuration extending through the central hole of the blade, and a retaining head adapted to register with the hole in the blade in a limited number of orientations of the blade and retainer with respect to each other, preferably only one such orientation. The blade hole desirably has a close-clearance relationship with the cylindrical shank of the retainer so as both to permit free rotation of such retainer as it revolves with the shaft when the blade is stopped, and also to locate the blade with its center substantially on the axis of the shaft and thereby hold the blade concentric with the shaft in the event either or both of the blade bolts are sheared or the blade is otherwise free to rotate relative to the blade carrier. The shape of the central blade hole and the head of the retainer are complementary so that there is at least one position, and preferably only one position, in which the head of the retainer will pass through the blade hole. On the other hand, the relationship between the hole and head is such that the head will retain the blade in its normal plane of rotation and substantially concentric with the shaft except in that one position of relative orientation.

Preferably, the head of the retainer has at least one elongated radial projection, and at least one other radial projection, desirably two such projections, which are shorter, and may be wider, than the first projection. The blade hole has a similar configuration, and this produces the desired result that the head will pass through the blade in only one relative orientation and will obstruct axial movement of the blade off the retainer in all other relative orientations. Accordingly, in the event the blade bolts are sheared, the retainer will hold the blade in its plane and substantially centered, so that the blade cannot either become disengaged from the retainer or moved to an eccentric position in which its rotation would produce a serious unbalance.

The accompanying drawings illustrate the invention and show embodiments exemplifying the best mode of carrying out the invention as presently perceived. In such drawings.

Figure 1:
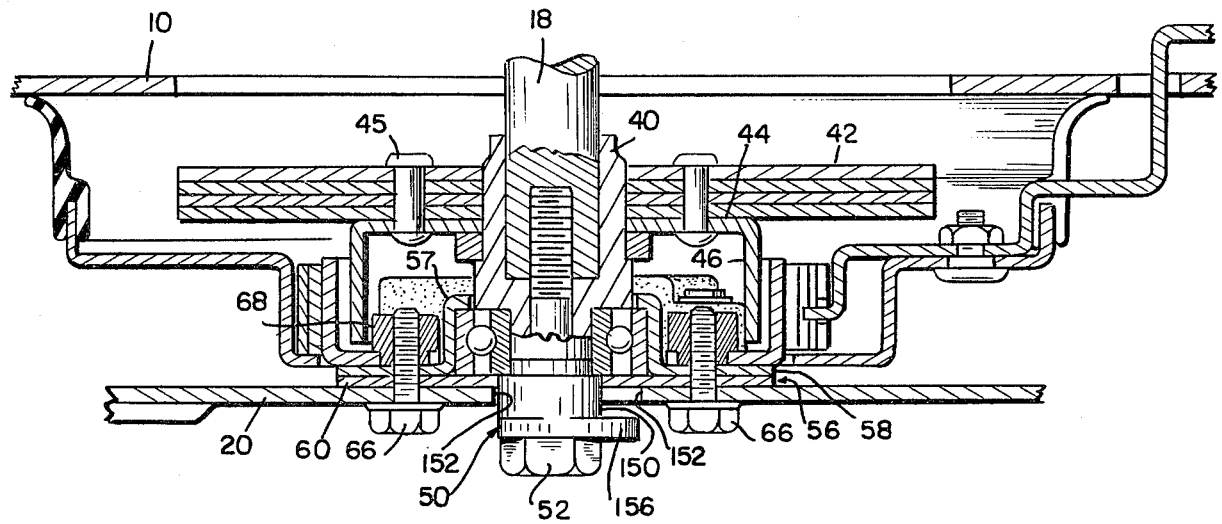
FIG. 1 is a vertical section of a clutch and brake mechanism with which a rotary lawn mower blade is mounted on its driving shaft and which includes a flywheel on the hub of such mechanism.

The lawn mower mechanism shown in FIG. 1 is similar to that of co-pending application Ser. No. 158,700, to which reference may be made for further details of the lawn mower as a whole and of the clutch and brake mechanism shown. The mechanism shown in FIG. 1 comprises a lawn mower housing 10 supported on wheels and carrying an internal combustion engine, not shown, which has a vertical shaft 18 projecting downward and carrying a rotary cutter blade 20 and its lower end. The blade 20 is connected to the shaft and controlled by a clutch and brake mechanism.

The clutch and brake mechanism comprises a hub 40 mounted on the engine shaft 18 and keyed thereto, and which carries a flywheel 42 and a clutch-driving member 44 having an outer depending cylindrical wall or drum 46. The flywheel 42 is made of four heavy-gauge stampings which are connected to each other and to the radial flange of the driving member 44 by rivets 45, and this assembly is securely locked to the hub 40. The driving drum lies axially close to the flywheel and extends downward with its open end at the bottom.

The hub 40 has a reduced lower end on which the inner race 48 of a ball bearing is mounted and clamped between a shoulder on the hub and an opposite shoulder on an annular spacer and blade retainer 50. The hub 40 and blade retainer 50 are held in assembled relation and secured to the shaft 18 by a bolt 52. The outer race 54 of the ball bearing supports a shoe carrier 56 which comprises an upper hat-shaped member 58 with a central cylindrical crown 57 engaged about and over the top edge of the outer race 54, and a bottom circular plate 60 fixed against the radial flange of the upper member 58 by means of rivets formed integral with and supporting pivot pins for driven clutch elements. In use, the two members 58 and 60 of the shoe carrier are also clamped together by two blade bolts 66 threaded into clinch nuts 68 fixed in openings in the outer flange portion of the upper carrier plate 58. There are two such clinch nuts 68 located at diametrically opposite points, circumferentially between the ends of the clutch and brake shoes mentioned below. The blade 20 has two bolt holes 21 to pass the two blade bolts 66. The blade carrier 56 lies with its crown 57 extending inward of the open end of the driving drum, in nested relation therewith, and with its blade-carrying flange 58–60 just below that open end, and hence close to the flywheel 42.

As more fully shown in application Ser. No. 158,700, two clutch and brake shoes are pivotally mounted on the carrier 58–60. Such shoes have arcuate drum-engaging clutching elements 74 which lie within and make clutching engagement with the inside surface of the driving drum 46, and brake drum segments 86 disposed radially outward from the driving drum 46 in position to be engaged by a brake band 90. The blade carrier 56 is driven by the clutch elements from the driving drum 44, and braked by the brake band 90, all under the control of a deadman control, as explained in application Ser. No. 158,700.

In accordance with the present invention, the blade keeper or retainer 50 which is secured to the lower end of the shaft 18 by the bolt 52 has a cylindrical portion or shank 150 which extends through a central blade opening or hole 152. The shank carries a head 154 of generally triangular shape, with truncated and rounded apexes, including one relatively long apex 156 and two shorter apexes 158. The sides of the triangular head 154 are substantially tangent to the cylindrical surface of the shank 150. The central blade hole 152 is of similar shape, with a central portion 153, one long radial extension 155, and two shorter radial extensions 157. The three sides of the opening, between such extensions, are substantially tangent to a central circle corresponding to the cylindrical shank 150 of the retainer 50, and such sides will provide bearing faces to ride on the side of the shank to hold the blade 20 concentric with the retainer and the shaft 18. The opening is slightly larger than the head so as to provide a small clearance at such bearing faces and for passage of the head 154 of the retainer through that hole 152 when the retainer and blade are in proper relative orientation. The small clearance, e.g., 0.03 inch on each side, will provide that if the blade bolts 66 are sheared, the blade will be held concentric with the shaft and any relative rotation will be substantially concentric.

Figure 3:
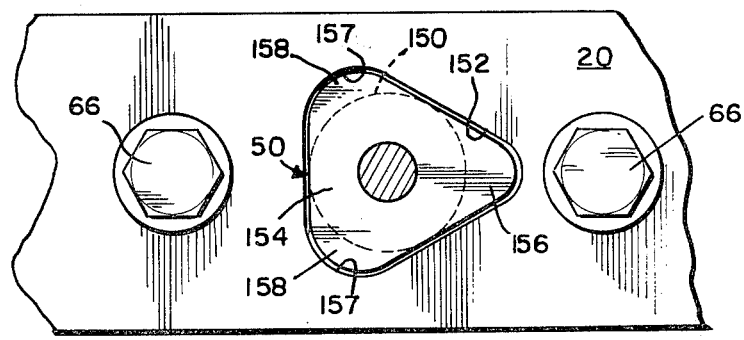
FIG. 3 is a bottom elevation of the blade mounting shown in FIG. 1 with the blade and blade retainer oriented in the one relative position they must take for removal of the blade from the blade carrier and retainer.

In this embodiment, the three projections 156 and 158 of the retainer head are of equal width and have sides at the same 60° included angle, but the projection 156 is longer. The head will have only one removal orientation relative to the blade opening 152, as shown in FIG. 3, in which the long projection 156 is aligned with a corresponding long extension 155 of the blade opening 152. As in the embodiment of FIG. 4, described below, the several projection of the head 154 and the corresponding extensions of the opening 152 may be of different widths to increase the number and size of overlaps in other orientations.

Figure 2:
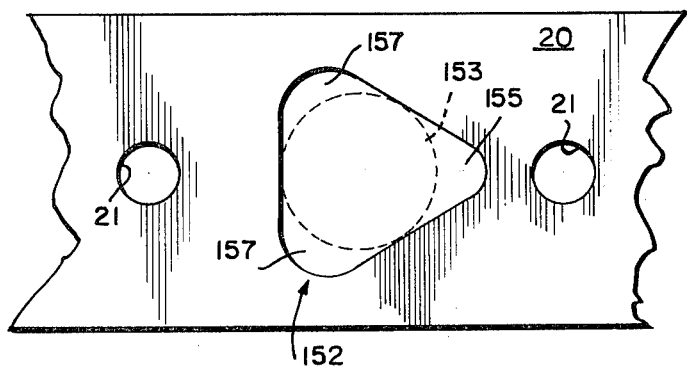
FIG. 2 is a bottom plan view of the blade showing the specially shaped central opening therein and the blade bolt holes.

When a blade as shown in FIGS. 1–3 is to be mounted on the blade carrier 56, the blade carrier will normally be declutched from the driving drum 46 and will be braked to a stop, but the engine will be de-energized so that the shaft 18 can be rotated if desired to bring the retainer 150 to any convenient orientation. The blade 20 is brought to the retainer 150 in the relative orientation shown in FIG. 3, in which the head 154 of the retainer is in registry with the blade hole 152 so as to permit the retainer head 154 to pass through such hole. The blade is then moved axially past the head and against the bottom plate 60 of the blade carrier 56. Once the blade 20 is in the plane of the shank 150, it can be rotated about the axis of that shank to align its bolt holes 21 with the nuts 68 of the carrier, and the blade bolts 66 are then inserted and tightened to secure the blade to the blade carrier.

In the event the blade strikes a fixed object during mower operation and the resulting stress shears one of the bolts 66, the remaining bolt and the shank 150 of the retainer 50 will hold the blade in its plane. Since there is only a small clearance between the blade hole 152 and that shank, the blade will also be held against swinging about the remaining bolt 66. The head 154 of the retainer may be in any of its many possible orientations, depending on which it happened to assume when the brake was released and the clutch engaged at the last operation of the deadman control. It will most likely be in an orientation other than that shown in FIG. 3 and the head will therefore be in a position to hold the blade in its plane.

In the event both bolts 66 are sheared, the blade drive will be interrupted and permit the shaft 18 and retainer to rotate relative to the blade. Until the deadman control is released, the engine will continue to drive the shaft and the retainer 50 and its head 154, while the blade may stop or rotate more slowly than the retainer. If the engine is declutched from the blade carrier and the latter is braked to a stop, the blade may continue to rotate under its own momentum. In any such case of relative rotation of the blade and retainer, the retainer head will tend to prevent axial separation of the blade from the retainer and the retainer will hold the blade in its plane and substantially concentric with the shaft.

Removal and installation of the blade will nevertheless by an easy operation, and will require only that the blade be oriented to bring its hole 152 into registry with the retainer head. The blade is then freely movable axially past the head.

Figure 4:
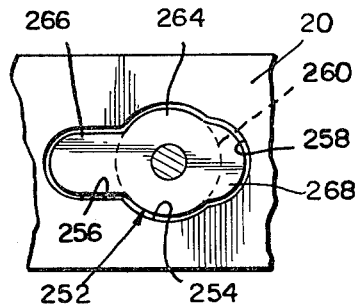
FIG. 4 is a bottom elevation, like FIG. 3, but showing a modified form of blade opening and retainer head.

In the modification shown in FIG. 4, the blade 120 has a retainer-receiving hole 252 which includes a circular central portion 254, a long narrow radial extension 256, and an opposite shorter and wider extension 258. The retainer 262 is of similar but slightly smaller shape, with a cylindrical shank 260, a circular center head portion 264, a long narrow projection 266, and a shorter and wider projection 268. The retainer and blade will have one relative orientation, shown in FIG. 4, in which the head will be in registry with the hole so that the blade can be moved either on or off the retainer by axial movement in that orientation. In all other orientations, the projections 266 and 268 will overlie the borders in the hole 252 to block axial movement of the blade past the head. Even in an orientation 180° from that shown, the long projection 266 will overlap the outer edge of the shorter hole extensions 258, while the shorter and wider projection 268 will overlap the side edges of the longer hole extension 256. In an analogous manner, the widths of the projections 156 and 158 of the modification of FIGS. 1—3 may be varied to provide additional areas of overlap between such projections and the edges of the blade opening 152, and thereby enhance the blocking effect of such retainer in orientations different from the single removal orientation shown in FIG. 3.

What is claimed is:

1. A safety mounting for a rotary lawn mower blade, comprising
   a blade carrier mounted for rotation on the axis of a depending drive shaft, and plurality of eccentrically positioned blade bolts for securing a blade to the carrier,
   a blade having bolt holes for the reception of said blade bolts and having a central opening which lies on the axis of the carrier when the blade is mounted on the carrier,
   a blade retainer fixed on the drive shaft, having a cylindrical shank extending through said blade opening and a head below the blade,
   said blade having bearing portions at the edge of said opening in bearing clearance relation with said retainer shank so as to hold the blade substantially concentric with the shank in the absence of blade bolts,
   said blade opening and retainer head having complementary unsymmetrical shapes adapted to register with each other in not more than a small limited number of relative orientations to permit axial movement of the blade off the retainer and to block such axial movement in all other orientations.

2. A safety mounting as in claim 1 in which said blade opening has a small number of radial extensions beyond said bearing portions, and said retainer head has a small number of radial projections adapted to register with said opening extensions in one relative orientation of the blade and retainer and to overlap the edge of said blade opening in other orientations so as to obstruct axial movement of the blade off the retainer.

3. A safety mounting as in claim 2 in which said blade opening and retainer head are generally triangular in shape, with three radially extending portions, one of which is longer than the others.

4. A safety mounting as in claim 2 in which said blade opening and retainer head are polygonal in shape, the sides of the polygonal opening having bearing clearance relation with the cylindrical retainer shank and the apexes of the retainer head projecting beyond such cylindrical shank.

5. A safety mounting as in claim 4 in which the blade opening and retainer head are generally triangular and with truncated apexes.

6. A safety mounting as in claim 5 in which the blade opening and retainer head are generally triangular and with truncated apexes, one of which is longer than the others.

7. A safety mounting as in claim 1 or 2 in which said blade opening and retainer head have a plurality of radially extending portions, one of which is longer than the others.

8. A safety mounting as in claim 1 or 2 in which said blade opening and retainer head have a plurality of radially extending portions, one of which is wider than the others.

9. A safety mounting as in claim 1 or 2 in which said blade opening and retainer head have a plurality of radially extending portions, one of which is longer than the others, and another of which is wider than the others, whereby each retainer projection will overlap the edge of the blade opening except in the one orientation in which the head and opening are in registry.

10. A safety mounting as in any of claims 1 through 6 in which said carrier is mounted for rotation relative to the drive shaft and driven from such shaft through a releasable clutch, said bearing clearance being sufficient to permit the retainer to rotate freely in the central opening of the blade when the blade is declutched.

* * * * *